United States Patent
Elfeky et al.

(10) Patent No.: US 8,326,600 B2
(45) Date of Patent: Dec. 4, 2012

(54) EVALUATING AND MODIFYING TRANSLITERATION RULES

(75) Inventors: Mohamed Elfeky, Mountain View, CA (US); Mohamed A. Taha, Zurich (CH)

(73) Assignee: Google Inc., Mountain View, CA (US)

( * ) Notice: Subject to any disclaimer, the term of this patent is extended or adjusted under 35 U.S.C. 154(b) by 219 days.

(21) Appl. No.: 12/854,797

(22) Filed: Aug. 11, 2010

(65) Prior Publication Data

US 2012/0041751 A1 Feb. 16, 2012

(51) Int. Cl.
*G06F 17/28* (2006.01)

(52) U.S. Cl. ............. 704/4; 704/2; 704/3; 704/5; 704/6; 704/7

(58) Field of Classification Search .................. 704/2–7
See application file for complete search history.

(56) References Cited

U.S. PATENT DOCUMENTS

| | | | | |
|---|---|---|---|---|
| 7,409,332 | B2 * | 8/2008 | Moore | 704/2 |
| 7,957,953 | B2 * | 6/2011 | Moore | 704/2 |
| 2004/0122656 | A1 * | 6/2004 | Abir | 704/4 |
| 2006/0015318 | A1 * | 1/2006 | Moore | 704/2 |
| 2006/0015322 | A1 * | 1/2006 | Moore | 704/5 |
| 2006/0111892 | A1 * | 5/2006 | Menezes et al. | 704/7 |
| 2006/0206308 | A1 * | 9/2006 | Moore | 704/5 |
| 2010/0004920 | A1 * | 1/2010 | Macherey et al. | 704/4 |
| 2011/0178791 | A1 * | 7/2011 | Stymne et al. | 704/2 |
| 2011/0202334 | A1 * | 8/2011 | Abir | 704/4 |

OTHER PUBLICATIONS

PCT International Search Report and Written Opinion for International Appln. No. PCT/US2011/047052 dated Nov. 7, 2011, 11 pages.

Bellare, K. et al., "Loss-Sensitive Discriminative Training of Machine Transliteration Models," Proceedings of the NAACL HLT Student Research Workshop and Doctoral Consortium, May 31, 2009, pp. 61-65.

Jia, Y. et al., "A Noisy Channel Model for Grapheme-based Machine Transliteration," Proceedings of the 2009 Named Entities Workshop, Suntec, Singapore, Aug. 7, 2009, pp. 88-91.

Knight, K. et al., "Machine Transliteration," Proceedings of the Meeting of the European Chapter of the Association of Computational Linguistics, Jan. 1, 1997, pp. 128-135.

Och, F., "Minimum Error Rate Training in Statistical Machine Translation," Proceedings of the 41st Annual Meeting of the Association for Computational Linguistics, Sapporo, Japan, Jul. 7, 2003, pp. 260-267.

Ekbal, A. et al., "A Modified Joint Source-Channel Model for Transliteration," Proceedings of the COLING/ACL 2006 Main Poster Sessions, Sydney, Australia, Jul. 17, 2006, pp. 191-198.

* cited by examiner

*Primary Examiner* — Douglas Godbold
(74) *Attorney, Agent, or Firm* — Harness, Dickey & Pierce, P.L.C.

(57) ABSTRACT

Methods, systems, and apparatus, including computer programs encoded on computer storage media, for adjusting transliteration weights. One methods includes maintaining transliteration rules and a weight for each rule and receiving training pairs comprising a first word in a first writing system and a second word in a second writing system, where the second word is a transliteration of the first word. The method further includes processing the training pairs to determine, for each transliteration rule, one or more good weight adjustments and one or more bad weight adjustments, and for one or more of the transliteration rules, selecting a good weight adjustment for the transliteration rule that has a highest associated gain and updating the weight for the transliteration rule to reflect the selected good weight adjustment for the rule.

27 Claims, 7 Drawing Sheets

600 

```
┌─────────────────────────────────────────────────┐
│ Incrementally determine, for each combination   │
│ of values for i and j, a highest score for      │
│ rules used to transliterate a prefix of length  │
│ i of a first word to a prefix of length j of    │
│ a second word                            602    │
└─────────────────────────────────────────────────┘
                         │
                         ▼
┌─────────────────────────────────────────────────┐
│ Select transliteration rules for the first word │
│ and the second word according to the determined │
│ scores                                   604    │
└─────────────────────────────────────────────────┘
```

FIG. 6

EVALUATING AND MODIFYING TRANSLITERATION RULES

BACKGROUND

This specification relates to transliteration systems.

Transliteration systems generate transliterations of words. A word written in a first writing system is transliterated to a transliteration written in a second writing system by mapping characters (or groups of characters) to corresponding transliterated characters.

Conventional transliteration systems apply transliteration rules to the characters of input words to generate transliterated words. In some transliteration systems, each rule has an associated weight. When multiple sets of rules can be used to generate multiple transliterations of a given word, the weights of the rules are used to select the best transliteration. The weights are generally configured by hand. The hand-configuration of weights is a time-consuming process. In addition, the resulting weights are not always optimal. Weights are not optimal when they lead to incorrect transliterations more than they lead to correct transliterations, or more often than other weights would do.

SUMMARY

In general, one aspect of the subject matter described in this specification can be embodied in methods that include the actions of maintaining a plurality of transliteration rules and a respective weight for each transliteration rule, wherein each transliteration rule specifies a mapping of one or more characters in a first writing system to one or more characters in a different second writing system; receiving a plurality of training pairs, wherein each training pair comprises a first word in the first writing system and a second word in the second writing system, wherein the second word is a transliteration of the first word, and wherein each first word and each second word comprises one or more characters; processing the plurality of training pairs to determine, for each transliteration rule, one or more good weight adjustments and one or more bad weight adjustments, wherein each good weight adjustment and each bad weight adjustment is a numerical value, and wherein each good weight adjustment and each bad weight adjustment corresponds to a respective training pair in the plurality of training pairs, wherein the processing includes deriving the good weight adjustment or the bad weight adjustment for the training pair from an analysis of the respective weights for one or more of the one or more transliteration rules that, when applied to the characters of the first word of the respective training pair, result in the characters of the second word of the respective training pair, wherein each good weight adjustment is an adjustment that increases accuracy of a transliteration resulting from an application of the plurality of transliteration rules to a first word in a training pair, and wherein each bad weight adjustment is an adjustment that decreases accuracy of a transliteration resulting from an application of the plurality of transliteration rules to a first word in a training pair; and for each of one or more of the plurality of transliteration rules: selecting a first good weight adjustment for the transliteration rule that has a highest associated gain, wherein the associated gain for a particular good weight adjustment for the transliteration rule is derived from a count of the good weight adjustments for the transliteration rule that do not exceed the particular good weight adjustment and a count of the bad weight adjustments for the transliteration rule that do not exceed the particular good weight adjustment, and updating the weight for each transliteration rule to reflect the first good weight adjustment for the rule to generate a respective updated weight for the transliteration rule. Other embodiments of this aspect include corresponding systems, apparatus, and computer programs recorded on computer storage devices, each configured to perform the operations of the methods.

These and other embodiments can each optionally include one or more of the following features. Deriving the good weight adjustment or the bad weight adjustment for a training pair comprises generating a plurality of candidate transliterations by applying the transliteration rules to the first word in the training pair; ranking the candidate transliterations, wherein the ranked candidate transliterations include a top-ranked candidate transliteration and a non-top-ranked candidate transliterations; identifying an identified candidate transliteration matching the second word of the transliteration pair; determining whether the identified candidate transliteration is the top-ranked candidate transliteration; if the identified candidate transliteration is the top-ranked candidate transliteration, calculating a respective bad weight adjustment for each of one or more rules used to generate the identified candidate transliteration and not used to generate the non-top-ranked candidate transliteration; and if the identified candidate transliteration is not the top-ranked candidate transliteration, calculating a respective good weight adjustment for each of one or more rules used to generate the identified candidate transliteration and not used to generate the top-ranked candidate transliteration. Ranking the candidate transliterations comprises determining a score for each candidate transliteration and ranking the candidate transliterations according to the scores, wherein the score for a candidate transliteration is derived from the respective weights of the rules used to generate the candidate transliteration. The score for each candidate transliteration is calculated by multiplying the respective weights of the rules used to generate the candidate transliteration. The score for each candidate transliteration is further calculated by multiplying a product of the respective weights of the rules used to generate the candidate transliteration by a frequency score for the candidate transliteration. Calculating the respective bad weight adjustment comprises deriving an adjustment factor from the weights of each rule used to generate the identified candidate transliteration and the weight of each rule used to generate the not-top-ranked candidate transliteration; identifying one or more rules used to generate the identified candidate transliteration and not used to generate the not-top-ranked candidate transliteration; and determining a respective bad weight adjustment for each identified rule by multiplying the determined adjustment factor by the weight of the identified rule. The adjustment factor is $$\left(\frac{S_{zi}}{S_y}\right)^{\frac{n}{m}},$$

where $S_{zi}$ is a product of the weights of the rules used to generate the non-top-ranked candidate transliteration, $S_y$ is a product of the weights of each rule used to generate the identified transliteration, m is a count of the rules used to generate the non-top-ranked candidate transliteration, and n is a count of the rules used to generate the top-ranked candidate transliteration. Calculating the respective good weight adjustment comprises deriving an adjustment factor from the weight of each rule used to generate the identified candidate transliteration and the weight of each rule used to generate the top-ranked candidate transliteration; identifying one or more identified rules used to generate the identified candidate transliteration and not used to generate the top-ranked candidate transliteration; and determining a respective good weight adjustment for each identified rule by multiplying the determined adjustment factor by the weight of the identified rule. The adjustment factor is $$\left(\frac{S_y}{S_{z1}}\right)^{\frac{m}{n}},$$

where $S_y$ is a product of the weights of the rules used to generate the identified candidate transliteration, $S_{z1}$ is a product of the weights of each rule used to generate the top-ranked candidate transliteration, n is a count of the rules used to generate the identified candidate transliteration, and m is a count of the rules used to generate the top-ranked candidate transliteration.

The gain for a particular good weight adjustment for a particular transliteration rule is the count of the good weight adjustments for the particular transliteration rule that do not exceed the particular good weight adjustment minus the count of the bad weight adjustments for the particular rule that do not exceed the particular good weight adjustment. Updating the weight for each transliteration rule to reflect the first good weight adjustment for the rule comprises multiplying the weight by the first good weight adjustment. The actions further include comparing an evaluation metric for the updated weights to an evaluation metric for the weights before the update to determine if the updated weights are improved, and if the comparison indicates that the updated weights are not improved, modifying one or more of the updated weights. Modifying one or more of the updated weights comprises identifying a highest gain weight, wherein the highest gain weight is the weight in the plurality of updated weights that was updated according to a weight adjustment having a highest gain as compared to the other weight adjustments; and changing a value of the highest gain weight to a pre-updated value.

Particular embodiments of the subject matter described in this specification can be implemented so as to realize one or more of the following advantages. Optimal weights for transliteration rules can be determined. Weights for transliteration rules can be tuned with little human intervention.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is a flow diagram of an example process for determining what combination of rules generates a particular transliteration of a word with an optimal score.

Like reference numbers and designations in the various drawings indicate like elements.

DETAILED DESCRIPTION

Figure 1:
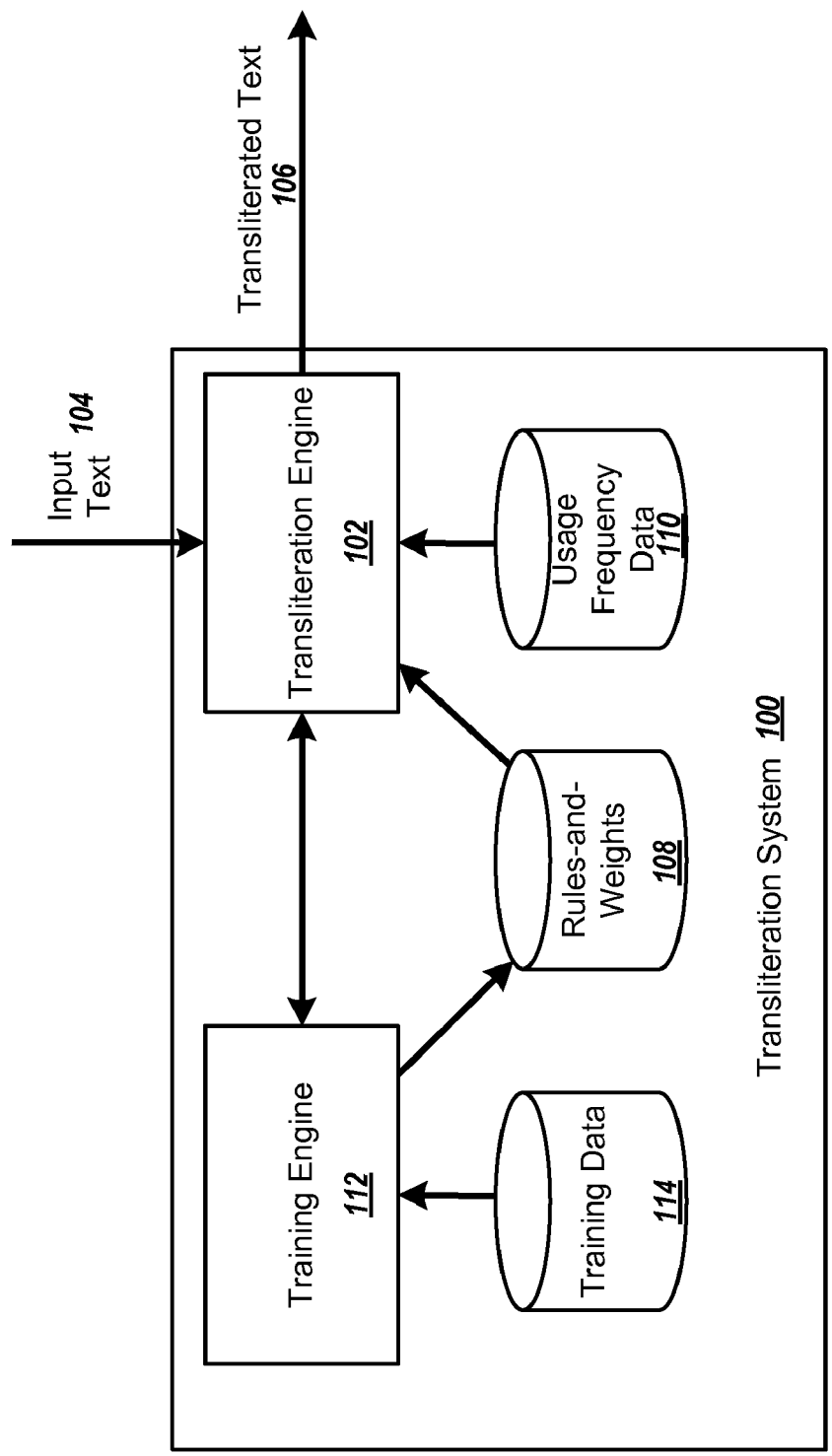
FIG. 1 is a block diagram of an example transliteration system.

FIG. 1 is a block diagram of an example transliteration system 100. The transliteration system 100 is implemented by software running on one or more computers. The transliteration system 100 uses a transliteration engine 102 to transliterate input text 104 resulting in transliterated text 106.

The transliteration engine 102 uses transliteration rules and corresponding weights stored in a rules-and-weights data store 108 to generate the transliterated text 106 from the input text 104. Each rule specifies a mapping from one set of characters to another set of characters. For example, one rule could map the English character "t" to the Arabic character "ت", e.g., "t"→"ت". This rule indicates that any time the letter "t" appears in English text, it could be replaced with the Arabic character "ت." Each rule used by the transliteration engine 102 has an associated weight. The weight estimates a confidence in the rule, e.g., how likely it is that applying the rule will result in a correct transliteration.

The transliteration engine 102 generates one or more candidate transliterations by applying the rules to the input text 104, and then scores each candidate transliteration. The transliteration engine 102 uses the weights to determine the score for each candidate transliteration. In some implementations, the transliteration engine 102 also uses usage frequency data 110 to generate a score for each candidate transliteration. The usage frequency data 110 is frequency measures for lettergrams, e.g., strings of letters of a particular length. The frequency measures are derived from estimates of how often the lettergrams are used in the transliterated writing system. In some implementations, the system uses lettergrams of a single length for any given language. For example, lettergrams of length five can be used for Russian. If a word is less than the lettergram length, for example, when a word is three characters long when the lettergram length is five, the system can store the word as a lettergram. To generate the frequency measure for a given word, the system multiplies the lettergram frequencies for all lettergrams in the word. For example, consider the word "strawberry." If lettergrams of length six are used, the word strawberry has the following lettergrams "strawb," "trawbe," "rawber," "awberr," and "wberry." If the lettergram "strawb" has a frequency of 0.1, the lettergram "trawbe" has a frequency of 0.2, the lettergram "rawber" has a frequency of 0.05, the lettergram "awberr" has a frequency of 0.1, and the lettergram "wberry" has a frequency of 0.3, the frequency measure for strawberry would be 0.1×0.2×0.05× 0.1×0.3=0.00006.

In some implementations, the transliteration engine generates a score for the candidate transliteration by multiplying the weights of the rules used to generate the candidate transliteration, normalizing by the number of rules, and multiplying the result by the usage frequency measure for the candidate transliteration, e.g., $$\text{score} = \left(\prod_{i \in R} weight_i\right)^{\frac{1}{size(R)}} \times \text{frequency measure},$$

where R is the set of rules used to generate a given candidate transliteration, $weight_i$ is the weight associated with rule i, and frequency measure is the usage frequency measure for the candidate transliteration. This score is a measure of the confidence in the transliteration and can be used, for example, to determine whether to automatically use the transliteration in other applications, such as augmenting search queries with synonyms.

The transliteration engine then outputs the highest scoring candidate transliteration as the transliterated text 106.

The weights in the rules-and-weights data store 108 are maintained by a training engine 112. The training engine 112 processes training data 114 to determine appropriate adjustments to the weights in the rules-and-weights data store 108, and then updates the weights accordingly.

The training data 114 is made up of training pairs. Each of the training pairs has a first word and a second word. The second word is the correct transliteration of the first word from the writing system of the first word to the writing system of the second word. The training pairs can be, for example, manually prepared training data. For example, language experts (or other people) can be asked to provide transliterations for a list of words. In some implementations, the provided transliterations can be analyzed, for example, to identify whether the language experts provided different transliterations for the same word. If so, the transliteration that is in the majority of the transliterations can be used as the correct transliteration. Alternatively, all transliterations can be used. In implementations where all transliterations are used, the system can optionally assign weights to the transliterations based on the frequency with which they were provided for the word. In some implementations, the weights are normalized to sum to one.

The training engine 112 receives scored candidate transliterations for the first word in each pair from the transliteration engine 102 and then determines appropriate weight adjustments for the weights of the rules used to generate the candidate transliterations. In general, the training engine 112 attempts to adjust the weights for the rules so that the correct transliterations receive the highest score of candidate transliterations for a given training pair. The process of determining the appropriate weight adjustments and updating the score is described in more detail below with reference to FIGS. 2-4.

Figure 2:
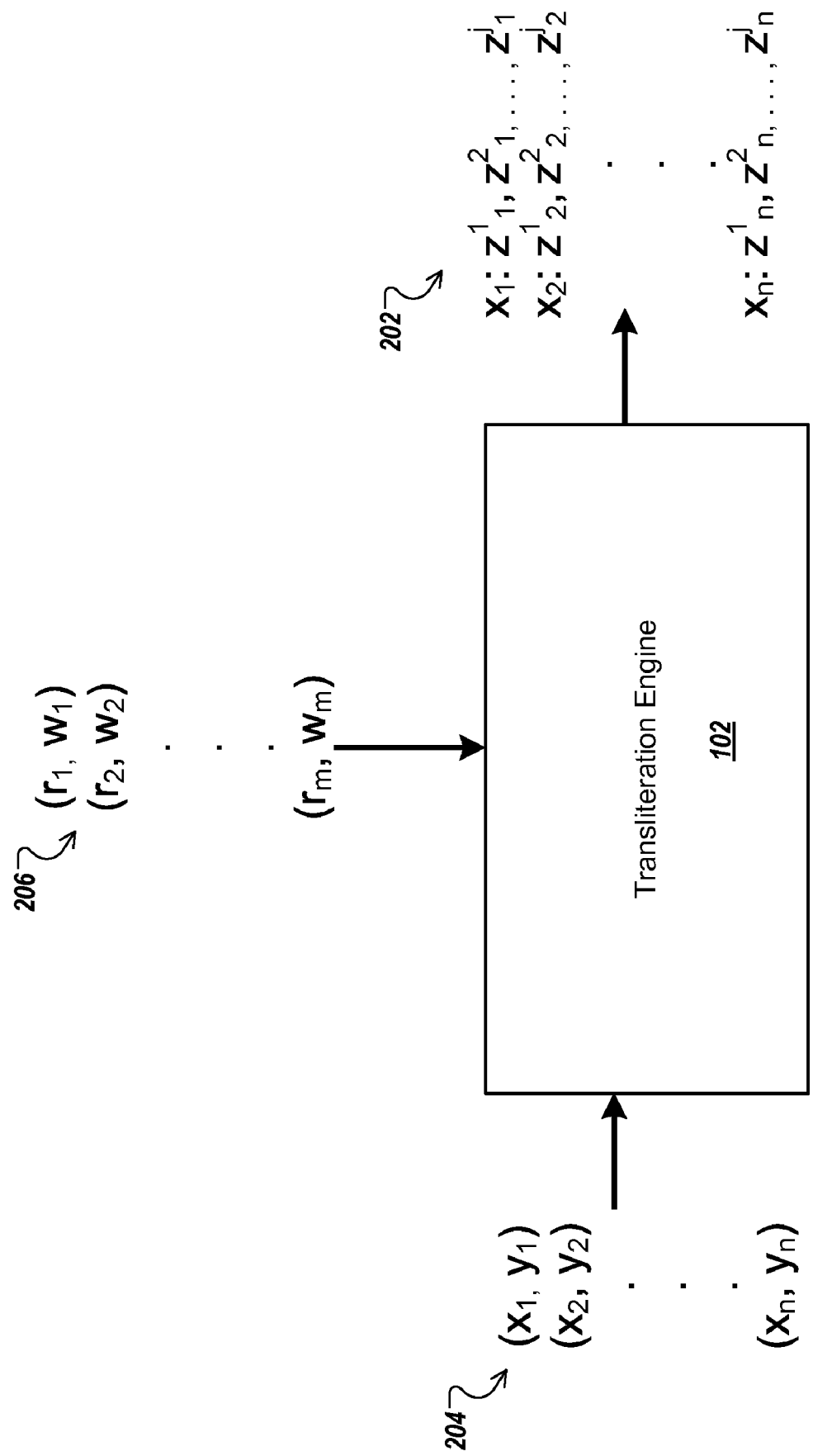
FIG. 2 illustrates an example of candidate transliterations generated by a transliteration engine from training data and rules-and-weights.

FIG. 2 illustrates an example of candidate transliterations 202 generated by a transliteration engine 102 from training data 204 and rules and weights 206. The transliteration engine 102 generates a set of candidate transliterations 202 for each individual training pair 204. The candidate transliterations are transliterations of the first word in the training pair. For example, training pair $(x_1, y_1)$ has corresponding candidate transliterations $z^1_1, z^2_1, \ldots z^j_1$. These candidate transliterations are each generated using one or more of the rules 206.

The candidate transliterations are ranked according to a score derived from the weights associated with the rules used to generate the candidate transliterations and optionally also from usage frequency data. Example scoring functions are described in more detail above, with reference to FIG. 1. In some implementations, only a specified number of the highest scored candidate transliterations are output by the transliteration engine 102 and considered by the training engine 112.

The training engine 112 attempts to select adjustments to the weights so that the top-ranked candidate transliteration $z^1$ for the first word x of each training pair (x, y) matches, e.g., is identical to, the second word y of the training pair. To do this, the training engine 112 considers the candidate transliterations for each training pair and determines good weight adjustments to rule weights which are adjustments that would result in the correct candidate transliteration being the top-ranked candidate input for a given input x and bad weight adjustments which are adjustments that would result in the correct candidate transliteration no longer being the top-ranked candidate transliteration for a given input x. Thus, the good weight adjustments increase the accuracy of a transliteration resulting from an application of the transliteration rules to a first word in the training pair, and the bad weight adjustments decrease the accuracy of a transliteration resulting from an application of the transliteration rules to a first word in a training pair. The training engine 112 then uses these good and bad weight adjustments to select appropriate adjustments to the weights of the rules, as described in more detail below.

Figure 3:
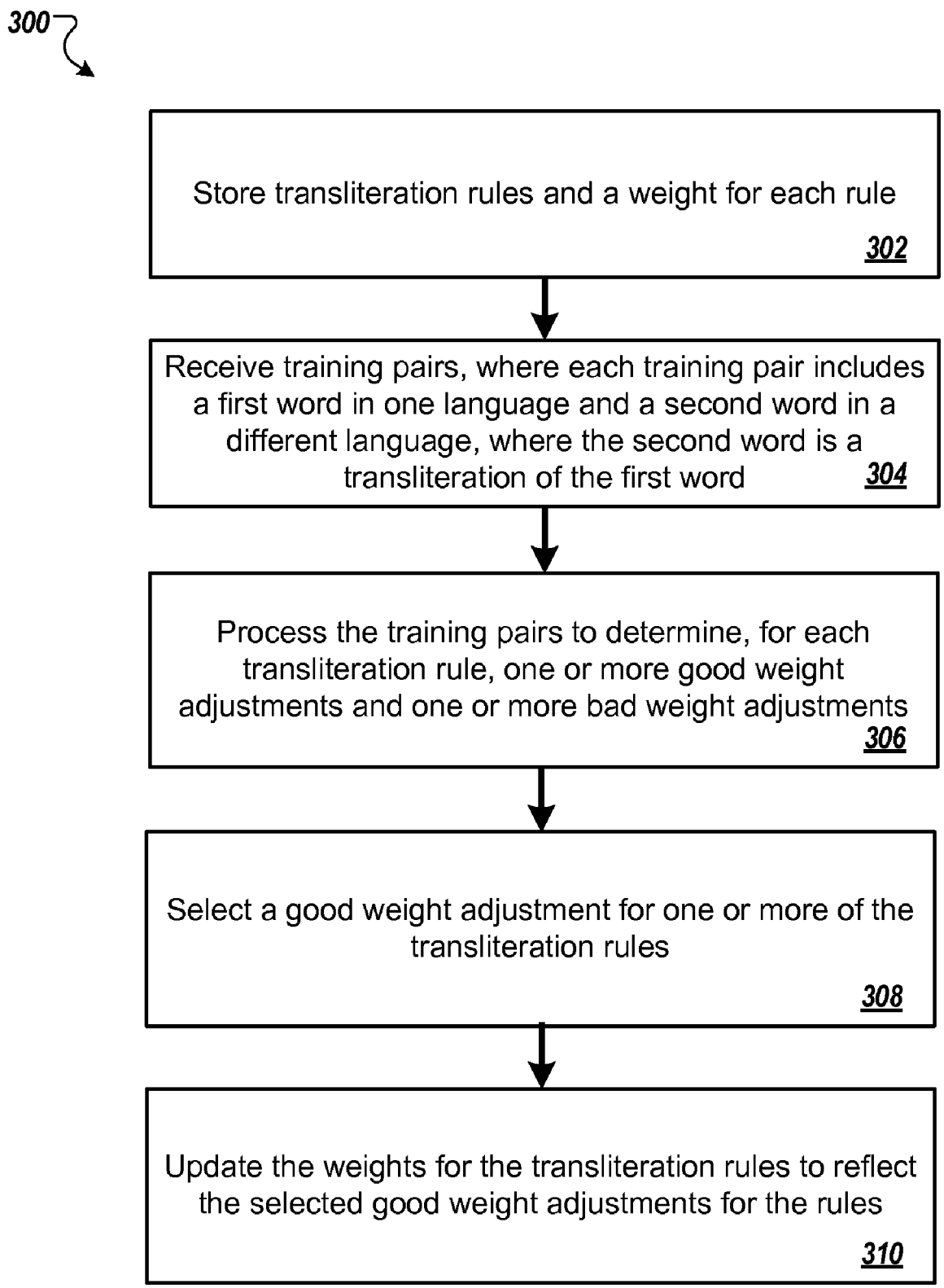
FIG. 3 is a flow diagram of an example process for updating the weights associated with transliteration rules.

FIG. 3 is a flow diagram of an example process 300 for updating the weights associated with transliteration rules. For convenience, the process 300 will be described in reference to a system of one or more computers that performs the process 300. The system can be, for example, the transliteration system 100 described above with reference to FIG. 1.

The system maintains, in a data store, transliteration rules and a weight for each rule (302). The system receives training pairs. Each training pair includes a first word and a second word. The second word is a transliteration of the first word (304).

The system processes the training pairs to determine, for each transliteration rule, one or more good weight adjustments and one or more bad weight adjustments (306). In general, the system generates the good weight adjustments and bad weight adjustments by generating multiple candidate transliterations for the first word in each training pair, ranking the candidate transliterations according to a ranking formula used by the transliteration engine, and determining whether the top-ranked candidate transliteration for a given training pair matches the second word of the training pair, whether any candidate transliteration for a given training pair matches the second word of the training pair, or whether none of the candidate transliterations match the second word of the training pair.

If the top-ranked candidate transliteration matches the second word of the training pair, the current weights used by the system already result in the correct transliteration for the particular training pair. Therefore, the system determines a bad weight adjustment, e.g., how much can the weights used to generate the top-ranked candidate transliteration, and not used to generate a non-top-ranked candidate transliteration, be adjusted before the top-ranked candidate transliteration for the first word in the training pair is no longer the correct transliteration. An example non-top-ranked candidate transliteration is the second-ranked candidate transliteration.

If the top-ranked candidate transliteration does not match the second word of the training pair, but one of the candidate transliterations does match the second word of the training pair, then the current weights used by the system do not result in the correct transliteration. Therefore, the system determines a good weight adjustment, e.g., how much should the weights used to generate the candidate transliteration that matches the second word of the training pair, and not used to generate the top-ranked transliteration, be adjusted so that the top-ranked candidate transliteration for the first word in the training pair is the correct transliteration. An example process for determining the good weight adjustments and the bad weight adjustments is described in more detail below with reference to FIG. 5.

If none of the candidate transliterations match the second word of the training pair, then a candidate transliteration has been omitted and the weights need to be adjusted so that the correct transliteration will be included. A valid candidate transliteration can be omitted from the list of candidate transliterations, for example, when a cutoff threshold is used, e.g., only the top ten generated transliterations are used as candidate transliterations.

When none of the candidate transliterations match the second word of the training pair, the system determines the highest-scoring ordered combination of rules that would result in a candidate transliteration matching the second word of the training pair. An example dynamic programming algorithm for making this determination is described in more detail below with reference to FIG. 6. The system then determines a good adjustment for each of the weights used in the highest-scoring ordered combination, and not used to generate the top-ranked transliteration, as described above and in more detail below with reference to FIG. 5.

After the process determines good and bad weight adjustments for the transliteration rules, the system selects a good weight adjustment for one or more of the transliteration rules (308). The selected good weight adjustment for a given transliteration rule is the good weight adjustment having a highest gain. The gain for a given weight adjustment and a given rule is derived from a count of the good weight adjustments for the given rule that are less than or equal to the given weight adjustment and a count of the bad weight adjustments for the given rule that are less than or equal to the given weight adjustment. For example, the gain for a given rule r and a given good weight adjustment a can be calculated according to the following formula:

$$\text{gain (adjustment } a) = \text{count of (good adjustments for } r \leq a) - \text{count of (bad adjustments for } r \leq a).$$

Other formulas, for example, dividing the count of desired weight adjustments for $r \leq a$ by the count of bad weight adjustments for $r \leq a$ can also be used. As another example, when weights are assigned to training pairs, as described above with reference to FIG. 1, weighted counts can be used instead of a plain count of the number of weight adjustments, where the weight for each weight adjustment is the weight of the pair used to identify the needed weight adjustment.

The system updates the weights for the transliteration rules to reflect the selected good weight adjustment for the rules (310). For example, the system can update a weight of a rule to be the product of the good weight adjustment and the current weight for the rule.

In some implementations, after the system adjusts the weight for the transliteration rules, the system verifies that the adjustments improved the overall performance of the transliteration system. In general, the system verifies that the updated weights improve the performance of the transliteration system by calculating a post-update evaluation metric for the updated weights and comparing the evaluation metric for the updated weights to a pre-update evaluation metric for the original (pre-update) weights.

Various evaluation metrics can be used. For example, in some implementations, the evaluation metric is an accuracy metric, e.g., the number of training pairs for which the top ranked candidate transliteration matches the correct transliteration. In other implementations, the evaluation metric is the accuracy metric divided by a miss score. The miss score is the number of training pairs for which the correct transliteration is not generated by the transliteration system.

If the post-update evaluation metric is better than the pre-update evaluation metric, the system uses the updated weights. However, if the post-update evaluation metric is not better than the pre-update evaluation metric, the system modifies the weights to try to improve the post-update evaluation metric.

Figure 4A:
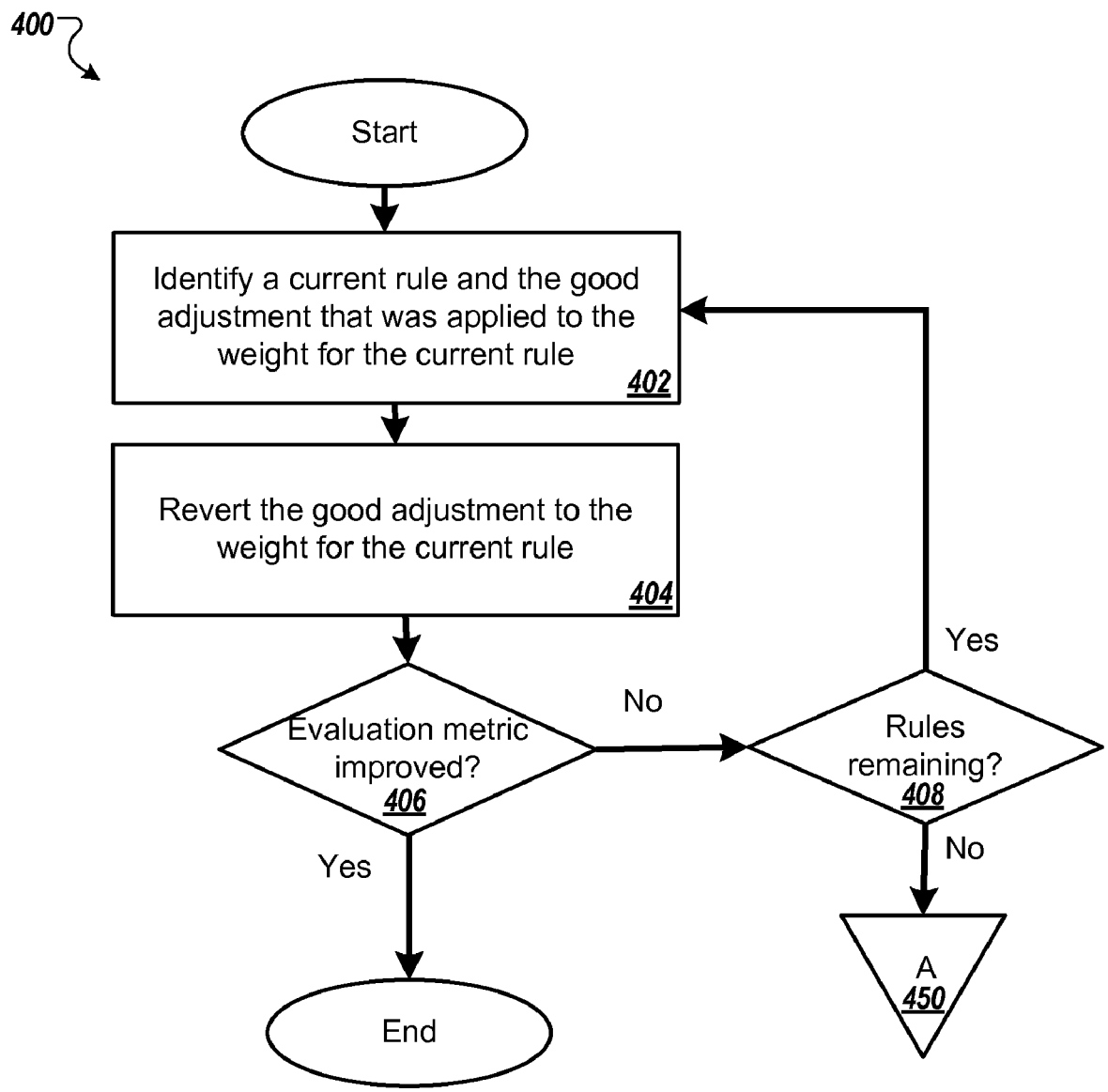
FIGS. 4A and 4B are flow diagrams of example processes for modifying the updated weights until the modified weights improve the performance of the transliteration engine.
Figure 4B:
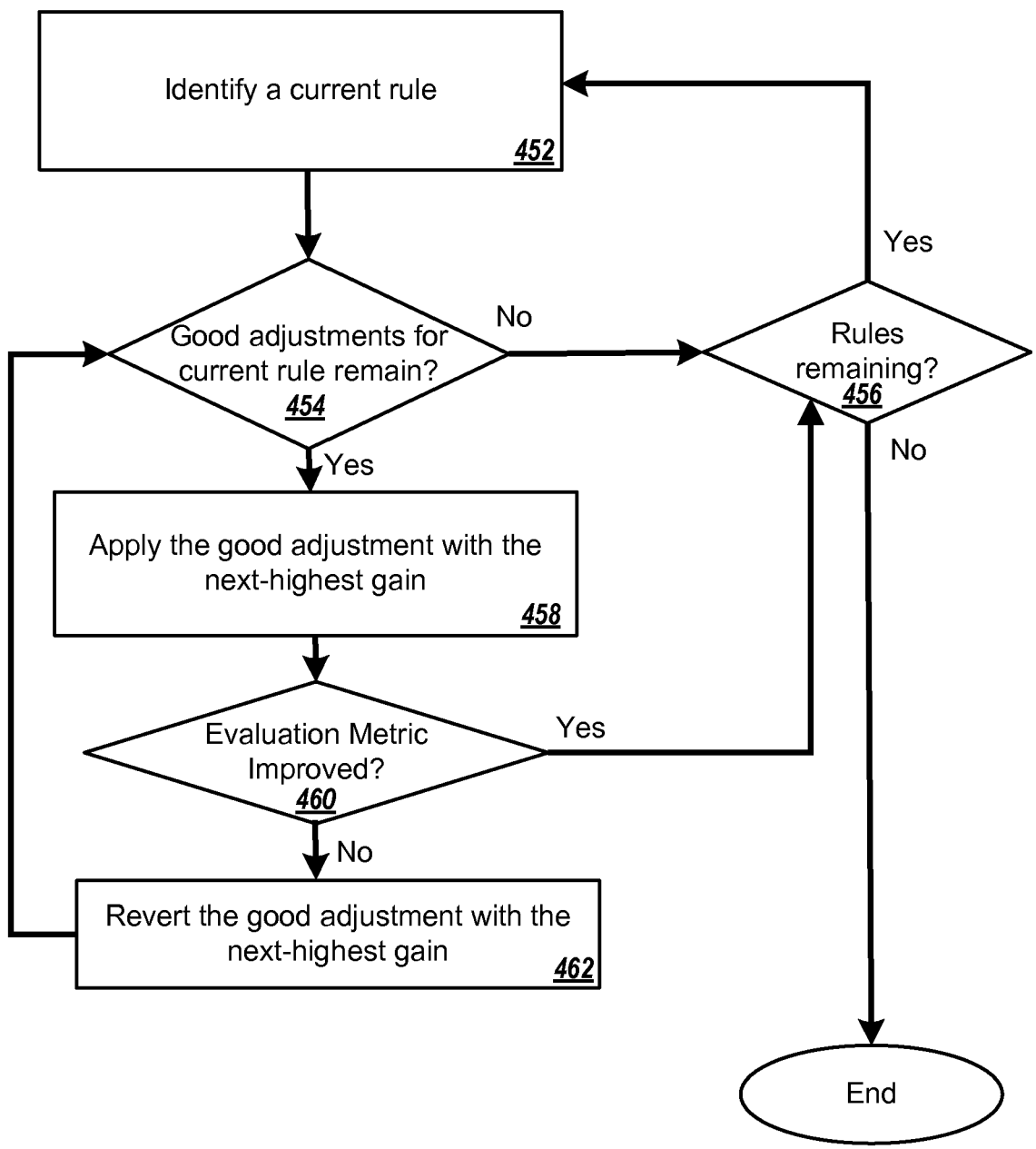

FIGS. 4A and 4B are flow diagrams of example processes 400 and 450 for modifying the updated weights until the modified weights improve the performance of the transliteration engine. For convenience, the processes 400 and 450 will be described in reference to a system of one or more computers that performs the processes 400 and 450. The system can be, for example, the transliteration system 100 described above with reference to FIG. 1.

As illustrated in FIG. 4A, a system performing the process 400 does the following. The system identifies a current rule and the good adjustment that was made to the weight of the current rule (402). In general, the system considers the rules whose weights were adjusted in order of the gain of the good weight adjustments that were applied to the weights of the rules, e.g., from highest to lowest. Therefore, the current rule is the first rule that has not yet been considered, in order of the gain of the good weight adjustments applied to the weights of the rules.

The system reverts the update to the identified current weight (404), i.e., returns the weight to its pre-updated value. The system then re-calculates the evaluation metric and determines whether the re-calculated evaluation metric is better than the post-update evaluation metric (406). If so, the system stops modifying the weights.

Otherwise, the system determines whether there are any other rules remaining (408). If so, the system identifies the next current weight (402) and repeats the process.

If the system has reverted the weight adjustment for all of the rules and has not improved the evaluation metric, the system then executes process 450.

As illustrated in FIG. 4B, a system performing the process 450 does the following. First, the system identifies a current rule (452). In general, the system considers the rules whose weights were adjusted in order of the gain of the good weight adjustments that were applied to the weights of the rules, e.g., from highest to lowest. Therefore, the current rule is the first rule that has not yet been considered by the process 450, in order of the gain of the good weight adjustments applied to the weights of the rules.

The system then checks to see if any good weight adjustments for the current rule remain (454). The good weight adjustments are good weight adjustments identified as described above and having a lower gain than the weight adjustment that was initially applied to the weight for the current rule.

If good weight adjustments for the current rule do not remain, the system determines whether there are any rules that have not been processed (456). If so, the system identifies a new current rule (452) and repeats the process. If not, the system ends execution of the process 450.

If there are still good weight adjustments for the current rule, the system applies the good weight adjustment with the next-highest gain for the rule (458). The system then re-calculates the evaluation metric and determines whether the re-calculated evaluation metric is better than the post-update evaluation metric (460). If so, the system determines if there are more rules remaining (456). If not, the system reverts the good weight adjustment with the next highest gain (462) and determines whether any good weight adjustments for the current rule remain (454).

In some implementations, once the process 450 ends, the system determines whether the process found an improvement to the evaluation metric. If so, the system re-starts process 400 from the improved weights to see if any further improvements can be made.

Figure 5:
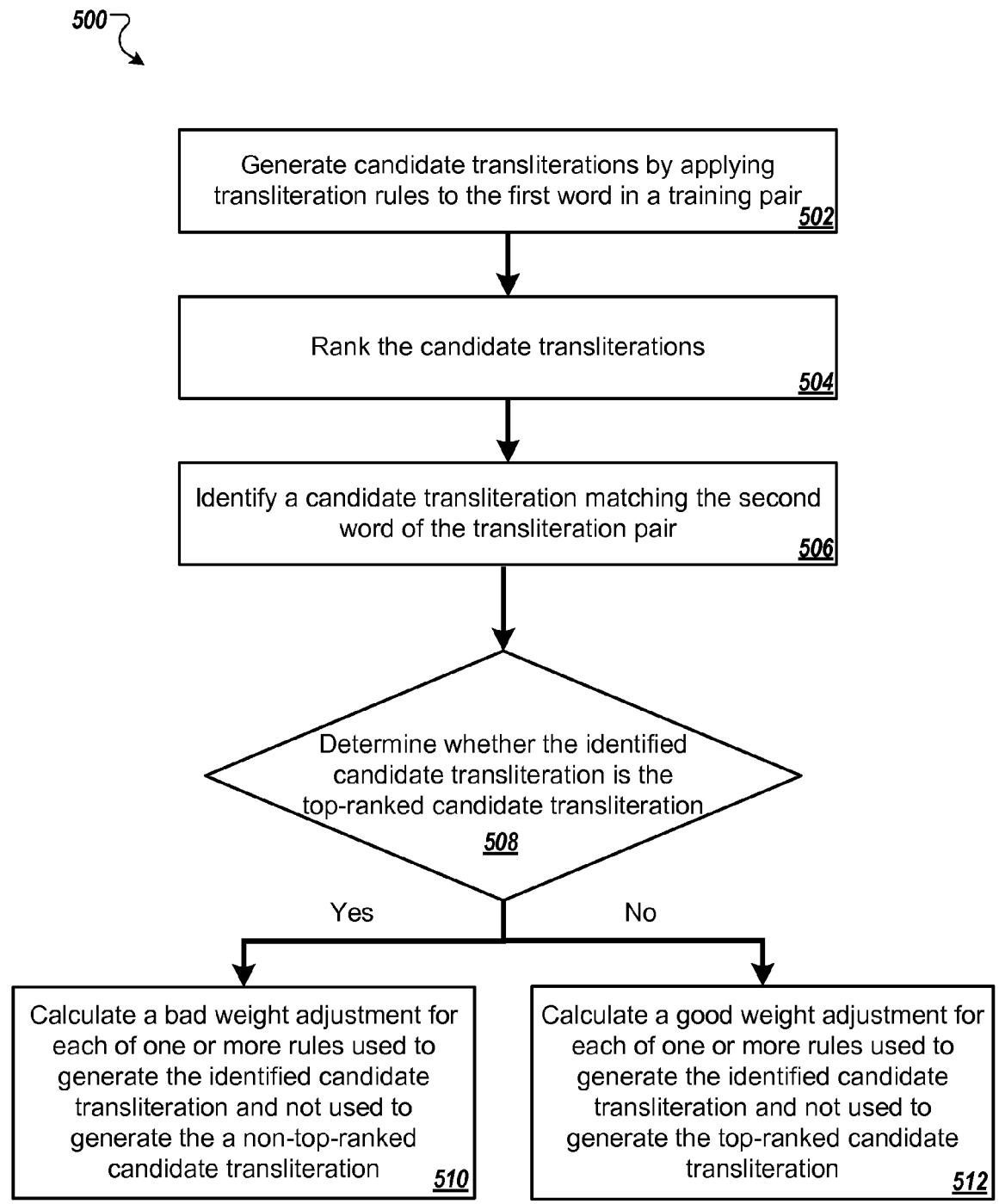
FIG. 5 is a flow diagram of an example process for determining good weight adjustments and bad weight adjustments for transliteration rules.

FIG. 5 is a flow diagram of an example process 500 for determining good weight adjustments and bad weight adjustments for transliteration rules. For convenience, the process 500 will be described in reference to a system of one or more computers that performs the process 500. The system can be, for example, the transliteration system 100 described above with reference to FIG. 1.

The system generates candidate transliterations by applying transliteration rules to the first word in a training pair (502) and ranks the candidate transliterations (504), for example, as described above with reference to FIG. 2.

The system identifies a candidate transliteration matching the second word of the transliteration pair (506). Two transliterations match if they are identical. The system determines whether the identified candidate transliteration is the top-ranked candidate transliteration (508).

If the identified candidate transliteration is the top-ranked candidate transliteration, the system calculates a bad weight adjustment for each of one or more rules used to generate the identified candidate transliteration and not used to generate a non-top-ranked, e.g., the second-ranked, candidate transliteration (510).

To do this, the system identifies the rules that were used to generate the top-ranked candidate transliteration, but not used to generate the non-top-ranked candidate transliteration. In some implementations, at the time the system generates the candidate transliterations, the system stores data indicating which rules were applied, and the order in which the rules were applied, to generate the candidate transliterations. In these implementations, the system identifies the rules that were used to generate the top-ranked candidate transliteration, but not used to generate the non-top ranked candidate transliteration, by taking an ordered set difference between the rules used to generate the top ranked candidate transliteration, but not used to generate the non-top ranked candidate transliteration.

The system also calculates a relative ratio of the geometric means of the weights used to generate the top-ranked candidate transliteration and the weights used to generate the non-top-ranked candidate transliteration. For example, the system can calculate the relative ratio according to the following formula:

$$\text{relative ratio} = \left(\frac{S_{zi}}{S_y}\right)^{\frac{n}{m}},$$

where $S_y$ is the product of the weights of the rules used to generate the identified (top-ranked) candidate transliteration, $S_{zi}$ is the product of the weights of the rules used to generate the non-top-ranked candidate transliteration, m is the number of rules used to generate the non-top-ranked candidate transliteration, and n is the number of rules used to generate the top-ranked candidate transliteration. The system uses the geometric mean to normalize the scoring function by the number of rules.

The system then uses this relative ratio as the bad weight adjustment for the rule.

If the identified candidate transliteration is not the top-ranked candidate transliteration, the system calculates a good weight adjustment for each of one or more rules used to generate the identified candidate transliteration and not used to generate the top-ranked candidate transliteration (512).

To do this, the system identifies the rules that were used to generate the identified candidate transliteration, but not used to generate the top-ranked candidate transliteration. In some implementations, at the time the system generates the candidate transliterations, the system stores data indicating which rules were applied, and the order in which the rules were applied, to generate the candidate transliterations. In these implementations, the system identifies the rules that were used to generate the identified candidate transliteration, but not used to generate the top-ranked candidate transliteration, by taking an ordered set difference between the rules used to generate the identified candidate transliteration, but not used to generate the top ranked candidate transliteration.

The system also calculates a relative ratio of the weights used to generate the identified candidate transliteration and the top-ranked candidate transliteration. For example, the system can calculate the relative ratio according to the following formula:

$$\text{relative ratio} = \left(\frac{S_y}{S_{z1}}\right)^{\frac{m}{n}},$$

where $S_y$ is the product of the weights of the rules used to generate the identified candidate transliteration, $S_{z1}$ is the product of the weights of the rules used to generate the top-ranked candidate transliteration, n is the number of rules used to generate the identified candidate transliteration, and m is the number of rules used to generate the top-ranked candidate transliteration.

The system then uses the relative ration as the good weight adjustment for the rule.

FIG. 6 is a flow diagram of an example process 600 for determining what combination of rules generates a particular transliteration of a word with an optimal score. The process 600 can be used, for example, when the second word in a transliteration pair is not one of the candidate transliterations generated for a first word in the transliteration pair, as described above with reference to FIG. 3. For convenience, the process 600 will be described in reference to a system of one or more computers that performs the process 600. The system can be, for example, the transliteration system 100 described above with reference to FIG. 1.

The system incrementally determines, for each combination of values of i and j, a highest score for rules used to transliterate a prefix of length i of a first word to a prefix of length j of a second word (602). The first and second words are the first and second words in the transliteration pair. The system increments the length of the prefixes of the first word and the length of the prefixes of the second word from zero to the length of the first pair minus one, and from zero to the length of the second pair minus one. The length of the prefix of the first word is i characters and the length of the prefix of the second word is j characters. For each value of i and j, the system determines what rule for mapping a suffix of the prefix of the first word to the suffix of the prefix of the second word would result in the highest score, i.e., what values of $len_1$ and $len_2$ would maximize the following equation:

$$F(i,j) = \max(\text{Weight}(\text{Rule}(len_1, len_2)) \times F(i-len_1, j-len_2)),$$

where Weight(Rule($len_1$, $len_2$)) is the weight of the rule that maps the suffix of length $len_i$ of the prefix of length i of the first word to the suffix of length $len_2$ of the prefix of length j of the second word, and $len_1$ and $len_2$ are the lengths of the suffixes selected for the prefixes of the first and the second words, respectively. The system stores the value of F(i,j) for each value of i and j. The value of F(i–$len_1$, j–$len_2$) can be retrieved from the previously stored values.

For example, the system can start with i=1 and j=1, hold i constant while iterating through all possible values of j and solving for F(i, j). The system can then increment i=2, and hold i constant while iterating through all possible values of j and solving for F(i, j). The system continues this process until F(i, j) has been calculated for all possible values of i and j. If it is not possible to calculate a value for F(i, j), for example, because there are no matching suffixes for the prefixes of length i and j, the system can use a default value, for example, 0.

Once the system has determined the values for F(i, j) for all lengths of prefixes of the first word and the second word, the system selects transliteration rules for the first word and the second word according to the determined scores (604). The system works backwards through the first and second word, selecting rules for the suffixes for the remaining characters in the words. First, the system selects the last rule selected. Then, the system selects the previously identified suffix rule that is optimal for values of i and j corresponding to the number of characters remaining in the first word after the suffix for the rule is removed and the number of characters remaining in the second word after the suffix for the rule is removed. The system continues to select suffix rules for the remaining number of characters until all characters have been accounted for.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions encoded on a computer storage medium for execution by, or to control the operation of, data processing apparatus. Alternatively or in addition, the program instructions can be encoded on a propagated signal that is an artificially generated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A system, comprising:
   one or more computers configured to perform operations comprising:
      maintaining a plurality of transliteration rules and a respective weight for each transliteration rule, wherein each transliteration rule specifies a mapping of one or more characters in a first writing system to one or more characters in a different second writing system;
      receiving a plurality of training pairs, wherein each training pair comprises a first word in the first writing system and a second word in the second writing system, wherein the second word is a transliteration of the first word, and wherein each first word and each second word comprises one or more characters;
      processing the plurality of training pairs to determine, for each transliteration rule, one or more good weight adjustments and one or more bad weight adjustments, wherein each good weight adjustment and each bad weight adjustment is a numerical value, and wherein each good weight adjustment and each bad weight adjustment corresponds to a respective training pair in the plurality of training pairs, wherein the processing includes deriving the good weight adjustment or the bad weight adjustment for the training pair from an analysis of the respective weights for one or more of the one or more transliteration rules that, when applied to the characters of the first word of the respective training pair, result in the characters of the second word of the respective training pair, wherein each good weight adjustment is an adjustment that increases accuracy of a transliteration resulting from an application of the plurality of transliteration rules to a first word in a training pair, and wherein each bad weight adjustment is an adjustment that decreases accuracy of a transliteration resulting from an application of the plurality of transliteration rules to a first word in a training pair; and
      for each of one or more of the plurality of transliteration rules:
         selecting a first good weight adjustment for the transliteration rule that has a highest associated gain, wherein the associated gain for a particular good weight adjustment for the transliteration rule is derived from a count of the good weight adjustments for the transliteration rule that do not exceed the particular good weight adjustment and a count of the bad weight adjustments for the transliteration rule that do not exceed the particular good weight adjustment, and
         updating the weight for the transliteration rule to reflect the first good weight adjustment for the rule to generate a respective updated weight for the transliteration rule.

2. The system of claim 1, wherein deriving the good weight adjustment or the bad weight adjustment for a training pair comprises:
   generating a plurality of candidate transliterations by applying the transliteration rules to the first word in the training pair;
   ranking the candidate transliterations, wherein the ranked candidate transliterations include a top-ranked candidate transliteration and a non-top-ranked candidate transliterations;
   identifying an identified candidate transliteration matching the second word of the transliteration pair;
   determining whether the identified candidate transliteration is the top-ranked candidate transliteration;
   if the identified candidate transliteration is the top-ranked candidate transliteration, calculating a respective bad weight adjustment for each of one or more rules used to generate the identified candidate transliteration and not used to generate the non-top-ranked candidate transliteration; and
   if the identified candidate transliteration is not the top-ranked candidate transliteration, calculating a respective good weight adjustment for each of one or more rules used to generate the identified candidate transliteration and not used to generate the top-ranked candidate transliteration.

3. The system of claim 2, wherein ranking the candidate transliterations comprises determining a score for each candidate transliteration and ranking the candidate transliterations according to the scores, wherein the score for a candidate transliteration is derived from the respective weights of the rules used to generate the candidate transliteration.

4. The system of claim 3, wherein the score for each candidate transliteration is calculated by multiplying the respective weights of the rules used to generate the candidate transliteration.

5. The system of claim 4, wherein the score for each candidate transliteration is further calculated by multiplying a product of the respective weights of the rules used to generate the candidate transliteration by a frequency score for the candidate transliteration.

6. The system of claim 2, wherein calculating the respective bad weight adjustment comprises:
deriving an adjustment factor from the weights of each rule used to generate the identified candidate transliteration and the weight of each rule used to generate the not-top-ranked candidate transliteration;
identifying one or more rules used to generate the identified candidate transliteration and not used to generate the not-top-ranked candidate transliteration; and
determining a respective bad weight adjustment for each identified rule by multiplying the determined adjustment factor by the weight of the identified rule.

7. The system of claim 6, wherein the adjustment factor is $$\left(\frac{S_{zi}}{S_y}\right)^{\frac{n}{m}},$$

wherein $S_{zi}$ is a product of the weights of the rules used to generate the non-top-ranked candidate transliteration, $S_y$ is a product of the weights of each rule used to generate the identified transliteration, m is a count of the rules used to generate the non-top-ranked candidate transliteration, and n is a count of the rules used to generate the top-ranked candidate transliteration.

8. The system of claim 2, wherein calculating the respective good weight adjustment comprises:
deriving an adjustment factor from the weight of each rule used to generate the identified candidate transliteration and the weight of each rule used to generate the top-ranked candidate transliteration;
identifying one or more identified rules used to generate the identified candidate transliteration and not used to generate the top-ranked candidate transliteration; and
determining a respective good weight adjustment for each identified rule by multiplying the determined adjustment factor by the weight of the identified rule.

9. The system of claim 8, wherein the adjustment factor is $$\left(\frac{S_y}{S_{z1}}\right)^{\frac{m}{n}},$$

wherein $S_y$ is a product of the weights of the rules used to generate the identified candidate transliteration, $S_{z1}$ is a product of the weights of each rule used to generate the top-ranked candidate transliteration, n is a count of the rules used to generate the identified candidate transliteration, and m is a count of the rules used to generate the top-ranked candidate transliteration.

10. The system of claim 1, wherein the gain for a particular good weight adjustment for a transliteration rule is the count of the good weight adjustments for the transliteration rule that do not exceed the particular good weight adjustment minus the count of the bad weight adjustments for the transliteration rule that do not exceed the particular good weight adjustment.

11. The system of claim 1, wherein updating the weight for a transliteration rule to reflect the first good weight adjustment for the rule comprises multiplying the weight by the first good weight adjustment.

12. The system of claim 1, wherein the operations further comprise:
comparing an evaluation metric for the updated weights to an evaluation metric for the weights before the update to determine if the updated weights are improved, and if the comparison indicates that the updated weights are not improved, modifying one or more of the updated weights.

13. The system of claim 12, wherein modifying one or more of the updated weights comprises:
identifying a highest gain weight, wherein the highest gain weight is the weight in the plurality of updated weights that was updated according to a weight adjustment having a highest gain as compared to the other weight adjustments; and
changing a value of the highest gain weight to a pre-updated value.

14. A computer-implemented method, comprising:
maintaining, at one or more computers, a plurality of transliteration rules and a respective weight for each transliteration rule, wherein each transliteration rule specifies a mapping of one or more characters in a first writing system to one or more characters in a different second writing system;
receiving, at the one or more computers, a plurality of training pairs, wherein each training pair comprises a first word in the first writing system and a second word in the second writing system, wherein the second word is a transliteration of the first word, and wherein each first word and each second word comprises one or more characters;
processing, at the one or more computers, the plurality of training pairs to determine, for each transliteration rule, one or more good weight adjustments and one or more bad weight adjustments, wherein each good weight adjustment and each bad weight adjustment is a numerical value, and wherein each good weight adjustment and each bad weight adjustment corresponds to a respective training pair in the plurality of training pairs, wherein the processing includes deriving the good weight adjustment or the bad weight adjustment for the training pair from an analysis of the respective weights for one or more of the one or more transliteration rules that, when applied to the characters of the first word of the respective training pair, result in the characters of the second word of the respective training pair, wherein each good weight adjustment is an adjustment that increases accuracy of a transliteration resulting from an application of the plurality of transliteration rules to a first word in a training pair, and wherein each bad weight adjustment is an adjustment that decreases accuracy of a transliteration resulting from an application of the plurality of transliteration rules to a first word in a training pair; and
for each of one or more of the plurality of transliteration rules:
selecting, at the one or more computers, a first good weight adjustment for the transliteration rule that has a highest associated gain, wherein the associated gain for a particular good weight adjustment for the transliteration rule is derived from a count of the good weight adjustments for the transliteration rule that do not exceed the particular good weight adjustment and a count of the bad weight adjustments for the transliteration rule that do not exceed the particular good weight adjustment, and updating, at the one or more computers, the weight for the transliteration rule to reflect the first good weight adjustment for the transliteration rule to generate a respective updated weight for the transliteration rule.

15. The method of claim 14, wherein deriving the good weight adjustment or the bad weight adjustment for a training pair comprises:

generating a plurality of candidate transliterations by applying the transliteration rules to the first word in the training pair;

ranking the candidate transliterations, wherein the ranked candidate transliterations include a top-ranked candidate transliteration and a non-top-ranked candidate transliterations;

identifying an identified candidate transliteration matching the second word of the transliteration pair;

determining whether the identified candidate transliteration is the top-ranked candidate transliteration;

if the identified candidate transliteration is the top-ranked candidate transliteration, calculating a respective bad weight adjustment for each of one or more rules used to generate the identified candidate transliteration and not used to generate the non-top-ranked candidate transliteration; and if the identified candidate transliteration is not the top-ranked candidate transliteration, calculating a respective good weight adjustment for each of one or more rules used to generate the identified candidate transliteration and not used to generate the top-ranked candidate transliteration.

16. The method of claim 15, wherein ranking the candidate transliterations comprises determining a score for each candidate transliteration and ranking the candidate transliterations according to the scores, wherein the score for a candidate transliteration is derived from the respective weights of the rules used to generate the candidate transliteration.

17. The method of claim 16, wherein the score for each candidate transliteration is calculated by multiplying the respective weights of the rules used to generate the candidate transliteration.

18. The method of claim 17, wherein the score for each candidate transliteration is further calculated by multiplying a product of the respective weights of the rules used to generate the candidate transliteration by a frequency score for the candidate transliteration.

19. The method of claim 15, wherein calculating the respective bad weight adjustment comprises:

deriving an adjustment factor from the weights of each rule used to generate the identified candidate transliteration and the weight of each rule used to generate the not-top-ranked candidate transliteration;

identifying one or more rules used to generate the identified candidate transliteration and not used to generate the not-top-ranked candidate transliteration; and determining a respective bad weight adjustment for each identified rule by multiplying the determined adjustment factor by the weight of the identified rule.

20. The method of claim 19, wherein the adjustment factor is $$\left(\frac{S_{zi}}{S_y}\right)^{\frac{n}{m}},$$

wherein $S_{z1}$ is a product of the weights of the rules used to generate the non-top-ranked candidate transliteration, $S_y$ is a product of the weights of each rule used to generate the identified transliteration, m is a count of the rules used to generate the non-top-ranked candidate transliteration, and n is a count of the rules used to generate the top-ranked candidate transliteration.

21. The method of claim 15, wherein calculating the respective good weight adjustment comprises:

deriving an adjustment factor from the weight of each rule used to generate the identified candidate transliteration and the weight of each rule used to generate the top-ranked candidate transliteration;

identifying one or more identified rules used to generate the identified candidate transliteration and not used to generate the top-ranked candidate transliteration; and determining a respective good weight adjustment for each identified rule by multiplying the determined adjustment factor by the weight of the identified rule.

22. The method of claim 21, wherein the adjustment factor is $$\left(\frac{S_y}{S_{z1}}\right)^{\frac{m}{n}},$$

wherein $S_y$ is a product of the weights of the rules used to generate the identified candidate transliteration, $S_{z1}$ is a product of the weights of each rule used to generate the top-ranked candidate transliteration, n is a count of the rules used to generate the identified candidate transliteration, and m is a count of the rules used to generate the top-ranked candidate transliteration.

23. The method of claim 14, wherein the gain for a particular good weight adjustment for a transliteration rule is the count of the good weight adjustments for the transliteration rule that do not exceed the particular good weight adjustment minus the count of the bad weight adjustments for the transliteration rule that do not exceed the particular good weight adjustment.

24. The method of claim 14, wherein updating the weight for a transliteration rule to reflect the first good weight adjustment for the rule comprises multiplying the weight by the first good weight adjustment.

25. The method of claim 14, further comprising:

comparing, at the one or more computers, an evaluation metric for the updated weights to an evaluation metric for the weights before the update to determine if the updated weights are improved, and if the comparison indicates that the updated weights are not improved, modifying one or more of the updated weights.

26. The method of claim 25, wherein modifying one or more of the updated weights comprises:

identifying a highest gain weight, wherein the highest gain weight is the weight in the plurality of updated weights that was updated according to a weight adjustment having a highest gain as compared to the other weight adjustments; and changing a value of the highest gain weight to a pre-updated value.

27. A non-transitory computer storage medium encoded with a computer program, the program comprising instructions that when executed by data processing apparatus cause the data processing apparatus to perform operations comprising:

maintaining a plurality of transliteration rules and a respective weight for each transliteration rule, wherein each transliteration rule specifies a mapping of one or more characters in a first writing system to one or more characters in a different second writing system;

receiving a plurality of training pairs, wherein each training pair comprises a first word in the first writing system and a second word in the second writing system, wherein the second word is a transliteration of the first word, and wherein each first word and each second word comprises one or more characters;

processing the plurality of training pairs to determine, for each transliteration rule, one or more good weight adjustments and one or more bad weight adjustments, wherein each good weight adjustment and each bad weight adjustment is a numerical value, and wherein each good weight adjustment and each bad weight adjustment corresponds to a respective training pair in the plurality of training pairs, wherein the processing includes deriving the good weight adjustment or the bad weight adjustment for the training pair from an analysis of the respective weights for one or more of the one or more transliteration rules that, when applied to the characters of the first word of the respective training pair, result in the characters of the second word of the respective training pair, wherein each good weight adjustment is an adjustment that increases accuracy of a transliteration resulting from an application of the plurality of transliteration rules to a first word in a training pair, and wherein each bad weight adjustment is an adjustment that decreases accuracy of a transliteration resulting from an application of the plurality of transliteration rules to a first word in a training pair; and for each of one or more of the plurality of transliteration rules:

selecting a first good weight adjustment for the transliteration rule that has a highest associated gain, wherein the associated gain for a particular good weight adjustment for the transliteration rule is derived from a count of the good weight adjustments for the transliteration rule that do not exceed the particular good weight adjustment and a count of the bad weight adjustments for the transliteration rule that do not exceed the particular good weight adjustment, and updating the weight for the transliteration rule to reflect the first good weight adjustment for the transliteration rule to generate a respective updated weight for the transliteration rule.

* * * * *